United States Patent [19]

Kagota

[11] Patent Number: 4,888,649
[45] Date of Patent: Dec. 19, 1989

[54] NONCOPIABLY RECORDED VIDEOTAPE AND NONCOPIABLY VIDEOTAPE-RECORDING SYSTEM

[75] Inventor: Minoru Kagota, Oume, Japan

[73] Assignee: Shinano Kikaku Company Ltd., Osaka, Japan

[21] Appl. No.: 169,622

[22] Filed: Mar. 18, 1988

[30] Foreign Application Priority Data

Mar. 18, 1987 [JP] Japan .................................. 62-063080

[51] Int. Cl.$^4$ ............................................. H04N 5/782
[52] U.S. Cl. .................................... 358/335; 360/37.1; 380/7; 380/10; 380/15
[58] Field of Search ........................ 358/335, 310, 318; 360/37.1; 380/3, 5, 10, 11, 15

[56] References Cited

U.S. PATENT DOCUMENTS

| | | | |
|---|---|---|---|
| 4,163,253 | 7/1979 | Morio et al. | 380/5 |
| 4,475,129 | 10/1984 | Kagota | 358/310 |
| 4,488,183 | 12/1984 | Kinjo | 380/5 |

Primary Examiner—Robert L. Richardson

[57] ABSTRACT

A video tape on which a series of video signal to be reproduced as a series of visible images by a video signal reproducing apparatus is recorded together with disturbing signals for disturbing a video tape-recorder in copying the series of video signals so as to be normally reproduced by a video signal reproducing apparatus. Each of the video signals is accompanying by a back porch and a horizontal synchronous signal and the series of video signals is divided into a plurality of subseries of video signals with vertical retrace-sweep blanking periods interposed and the horizontal synchronous signals being contained also in the vertical retrace-sweep blanking periods. The disturbing signals include a series of first pulse signals inserted just after the horizontal synchronous signals and a series of second pulse signals inserted in a period after the horizontal synchronous signals wherein the period corresponds to the time of the back porch.

4 Claims, 3 Drawing Sheets

NONCOPIABLY RECORDED VIDEOTAPE AND NONCOPIABLY VIDEOTAPE-RECORDING SYSTEM

BACKGROUND OF THE INVENTION

This invention relates to a noncopiably but reproducibly recorded videotape, and to a video signal recording system capable of recording video signal on a videotape noncopiably therefrom to other videotapes but reproducibly on a television receiver through a usual videotape playback apparatus.

In one of the conventional common methods of recording video signals on a videotape noncopiably therefrom to another tape, recording is made with vertical synchro signals kept at a level lower than a normal level. In trying to copy the signals recorded in such a manner to another videotape with a usual video recorder, the synchro signal separator of the recorder cannot be properly operatd because of the deliberate weakness of the vertical sysnchro signals. But it is no problem to reproduce the recorded video signals on a television picture screen by increasing the vertical synchro signals to a normal level by means of a vertical synchro signal controller incorporated in most of the television receiving apparatus.

However, the prior art system has the following disadvantages:

(1) If the synchro signal controller of a video-tape recorder has a sufficient sensitivity to allow the video signals to be reproduced on another videotape, the original videotape is in danger of being pirated;

(2) It is troublesome to adjust the vertical synchro signal controller each time when the videotape is played back on a television receiving set;

(3) It may happen that the video signals cannot be reproduced because the maximum adjustable level of the vertical synchro signal controller of the televeision receiving set is low; and (4) If the television receiving is not provided with a synchro signal controller, it is absolutely impossible for the videotape to be played back.

OBJECTS AND SUMMARY OF THE INVENTION

Aiming at solving the problems and difficulties pointed out with respect to the prior art, the present invention makes it a principal object to provide a videotape on which video signals are recorded noncopiably therefrom to another tape but reproducibly on a television receiving set.

Another object of the present invention is to provide an improved video signal recording system capable of recording video signals on a videotape noncopiably therefrom to another tape but reproducibly on a televiesion receiveing set.

A videotape on which video signals are recorded according to the present invention contains two kinds of AGC disturbing pulses additionally recorded within the vertical retrace-sweep blanking periods.

A video signal recording system according to the present invention includes a first pulse generator outputting first disturbing pulses following the synchro signals existing in the vertical retrace-sweep blanking periods contained in a series of video signals to be recorded, a second pulse generator outputting second disturbing pulses delayed from said first disturbing puses by the time interval equal to the back porch portions of the video signals, a first gating means for allowing the first and the second disturbing pulses to pass only during the vertical retrace-sweep blanking periods contained in the video signals, a second gating means for allowing the first and second disturbing pulses to pass alternatingly at predetermined time intervals after they have passed through the first gating means, a further pulse generating means for outputting pulses synchronous with the horizontal synchro signal at the same timings as those given by the first and the second gating means, and a mixer through which the first and the second disturbing pulses and the output from said further pulse generating means are supplied to a video head, by which they are recorded on a videotape together with the video signals.

DETAILED DESCRIPTION OF THE INVENTION

Figure 1:
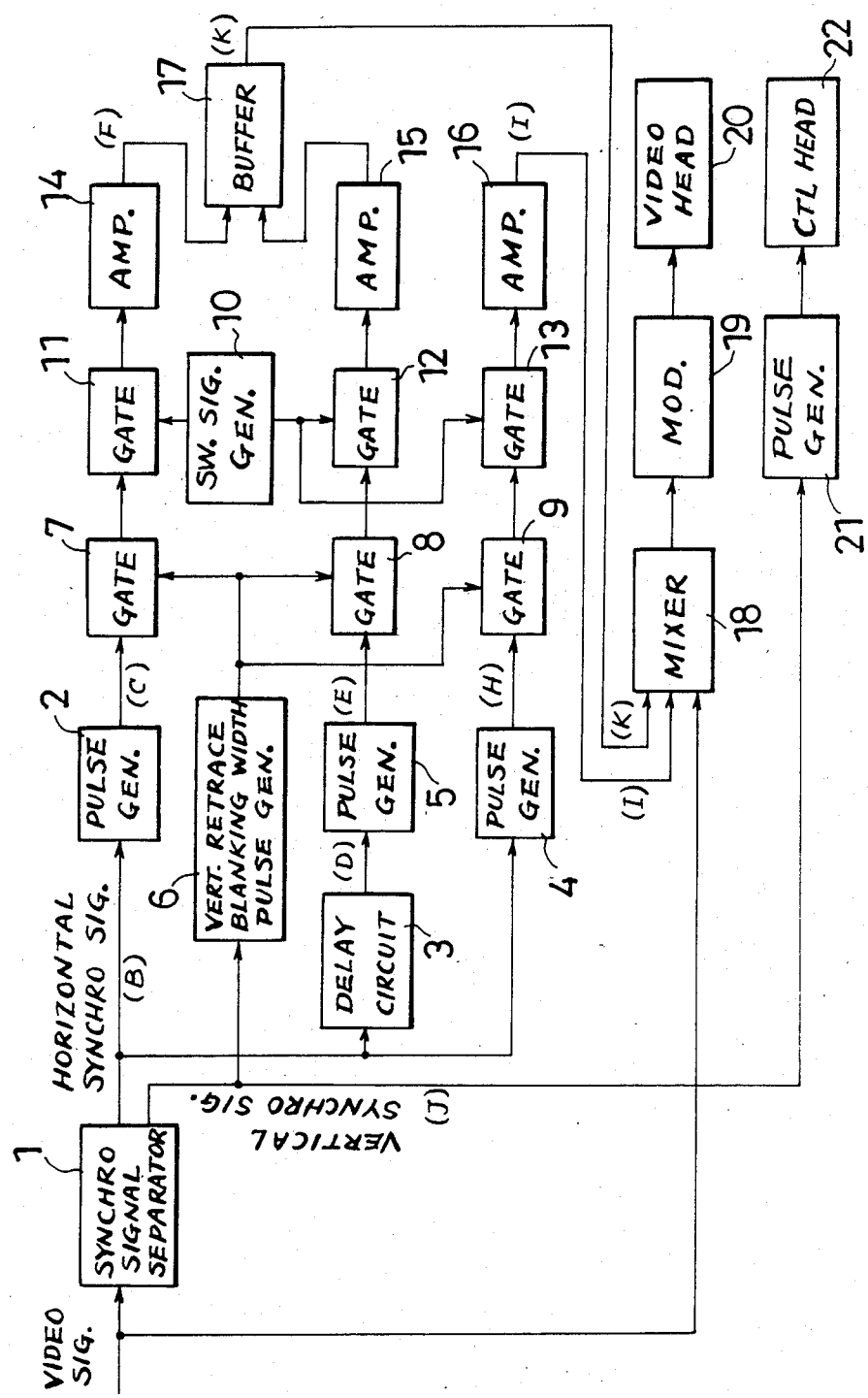
FIG. 1 is a blockdiagram showing the constitution of an embodiment of the present invention.
Figure 2:
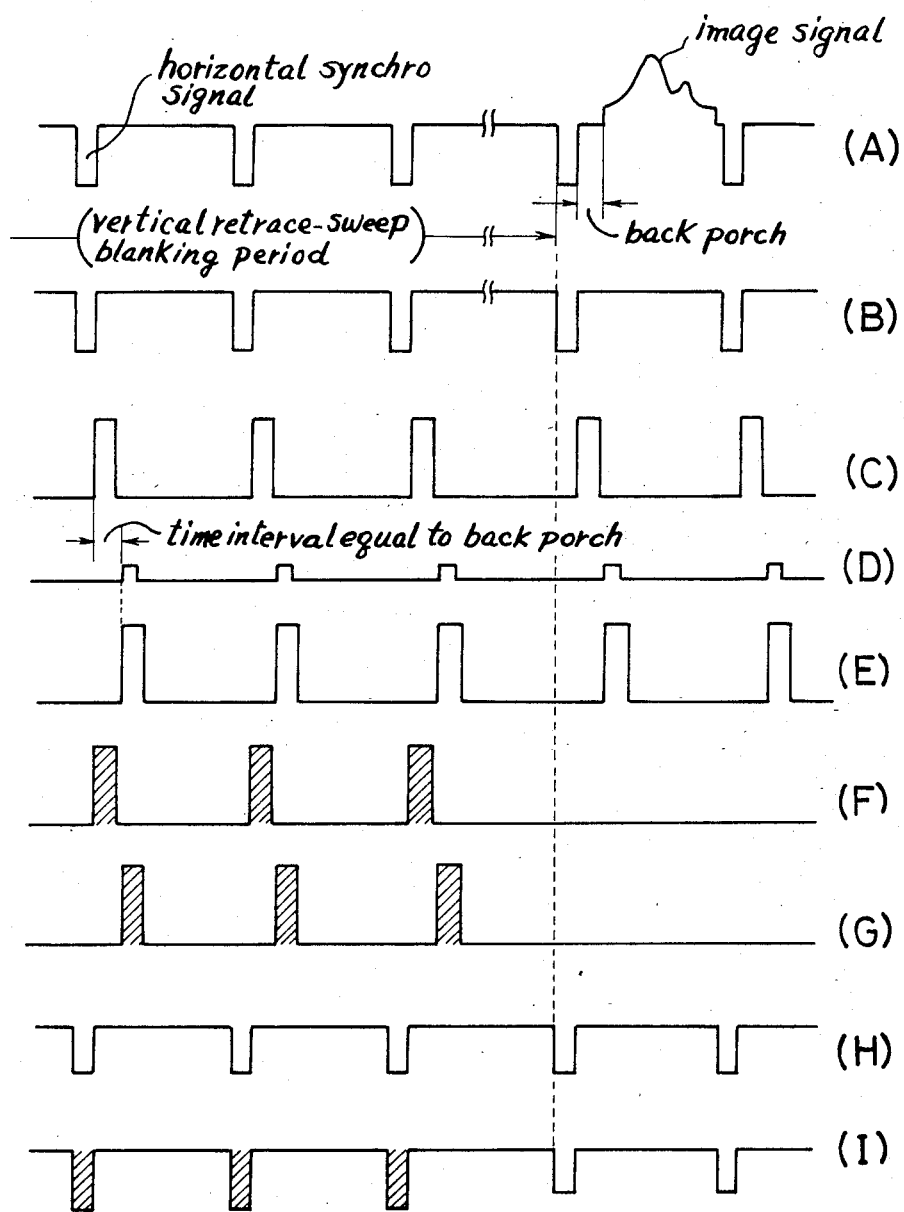
FIG. 2, consisting of (A)–(I), shows wave forms of various signals illustrating the function of the embodiment shown in FIG. 1.
Figure 3:
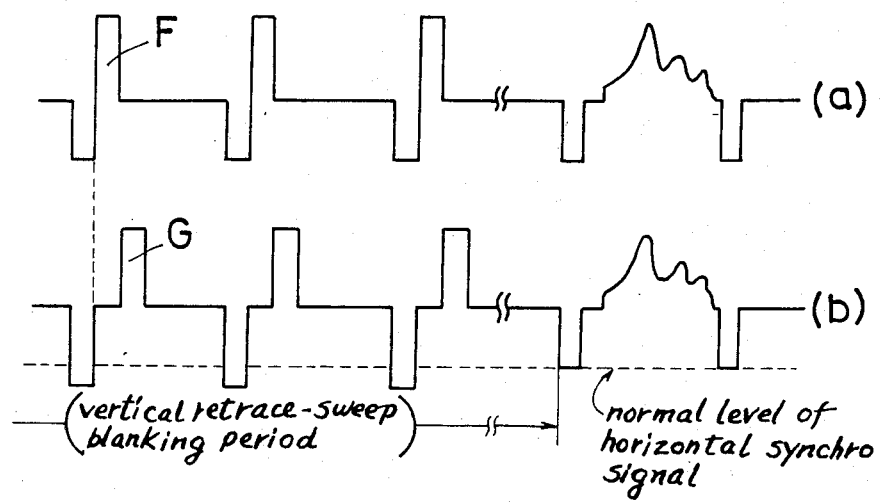
FIG. 3, consisting of (a) and (b), shows the resultant video signals recorded with the embodiment shown in FIG. 1.

Referring to FIG. 1, which shows an embodiment of the present invention blockdiagrammatically, a series of video signals to be recorded is, in the first place, inputted to a synchro signal separator 1 for separating the vertical synchro signal and the horizontal synchro signal from each other, both contained in the video signals. The horizontal synchro signal B is inputted to a pulse generator 2, which generates a series of first disturbing pulses synchronous with the second edges of the horizontal synchro signal. The first disturbing pulses are transmitted to an amplifier 14 through two gates 7 and 11. The gate 7, which is operated by a pulse generator 6, opens only during the vertical retrace-sweep blanking periods of the video signals, while the gate 11 is operated by a switching pulse generator 10 and opens alternatingly with a gate 12 for a period of about 0,05 second. On the other hand a pulse generator 5 generates a series of second disturbing pulses delayed from the horizontal synchro signal, being triggered by the output from a delay circuit 3 for delaying (D) the horizontal synchro signal B. The second disturbing pulses E are transmitted to an amplifier 15 through a gate 8 and the above mentioned gate 12. The gate 8 also opens at the same time of the gate 7. The outputs from both the amplifiers 14 and 15 are inputted to a mixer 18 through a buffer circuit 17. A pulse generator 4 provide pulses H in synchronism with the horizontal synchro signal B. The pulses H are also transmitted to the mixer 18 through gates 9 and 13 and an amplifier 16. The gates 9 and 13 open at the same time of the gates 8 and 12, respectively. The mixer 18 is supplied also with the video signals. As is understood from the above constitution of the embodiment, the output signals at the portions indicated by symbols (A) to (I) in FIG. 1 have the wave forms as shown in FIG. 2. The output from the mixer is frequency-modulated by a modulator 19 and then supplied to a video head 20. As the result a series of video signals as shown in FIG. 3 is recorded on a videotape.

According to the present embodiment, the disturbing pulses F and G inserted in the vertical retrace-sweep periods (FIG. 3) and varying level of horizontal synchro signal I disturbes the operation of the AGC circuit of a usual video recorder, causing the video signals not to be copied properly. But the disturbing pulses are inserted in the vertical retrace-sweep blanking periods, and therefore, it is no problem to reproduce the video signal on a tetlvision receiver.

What is claimed is:

1. A video tape on which a series of video signals to be reproduced as a series of visible images by a video signal reproducing apparatus is recorded together with disturbing signals for disturbing a video tape-recorder in copying said series of video signals so as to be normally reproduced by a video signal reproducing apparatus, each of said video signals being accompanied by a back porch and a horizontal synchronous signal, said series of video signals being divided into a plurality of subseries of video signals with vertical retrace-sweep blanking periods interposed and said horizontal synchronous signals being contained also in said vertical retrace-sweep blanking periods, said disturbing signals comprising:

a series of first pulse signals inserted just after said horizontal synchronous signals in said vertical retrace-sweep blanking periods, said period corresponding to the time of said back porch;

said series of first pulse signals and said series of second pulse signals being recorded alternatively.

2. A video tape as defined in claim 1, wherein said horizontal synchronous signals contained in said vertical retrace-sweep blanking periods are made to have their level different from that of said horizontal synchronous signal accompanying each of said video signals.

3. A video signal recording system made capable of recording a series of video signals together with disturbing signals for disturbing a video tape-recorder in copying said series of video signals so as to be normally reproduced by a video signal reproducing apparatus, each of said video signals being accompanied by a back porch and a horizontal synchronous signal, said series of video signals being divided into a plurality of subseries of video signals with vertical retrace-sweep blanking periods interposed and said horizontal synchronous signals being contained also in said vertical retrace-sweep blanking periods, said video signal recording system comprising:

a first pulse generating means for generating a series of first pulse signals following just after said horizontal synchronous signals;

a second pulse generating means for generating a series of second pulse signals retarded from said horizontal synchronous signals by the time corresponding to said back porch;

a first gating means for making said first pulses and said second pulses pass only during said vertical retrace-sweep blanking periods;

a second gating means for making said first pulses and said second pulses, both through said first gating means, pass alternately at predetermined time intervals; and a signal mixing means for mixing said series of video signals with said first pulse signals and second pulse signals, both through said second gating means.

4. A video signal recording system as defined in claim 3, wherein there is further provided a means for generating third pulse signals synchronous with said horizontal synchronous signals and having a level different from that of said horizontal synchronous signals, and said third pulse signals are also inputting to said signal mixing means.

* * * * *

UNITED STATES PATENT AND TRADEMARK OFFICE
CERTIFICATE OF CORRECTION

PATENT NO. : 4,888,649
DATED : December 19, 1989
INVENTOR(S) : Minoru Kagota

It is certified that error appears in the above-identified patent and that said Letters Patent is hereby corrected as shown below:

Title page:

Item (73): Change "Shinano Kikaku Company Ltd., Osaka, Japan"" to
Assignee --Shinano Kikaku Company Ltd., Tokyo, Japan--

Signed and Sealed this

Twenty-fourth Day of November, 1992

Attest:

DOUGLAS B. COMER

*Attesting Officer*     *Acting Commissioner of Patents and Trademarks*